United States Patent [19]

Huegel et al.

[11] Patent Number: 4,773,803
[45] Date of Patent: Sep. 27, 1988

[54] EXPANSION DOWEL ASSEMBLY WITH EXTENSION ON EXPANSION MEMBER

[75] Inventors: Robert Huegel, Kaufering; Armin Herb, Peissenberg, both of Fed. Rep. of Germany

[73] Assignee: Hilti Aktiengesellschaft, Fürstentum, Liechtenstein

[21] Appl. No.: 940,966

[22] Filed: Dec. 12, 1986

[30] Foreign Application Priority Data

Dec. 12, 1985 [DE] Fed. Rep. of Germany ....... 3543888

[51] Int. Cl.⁴ .............................................. F16B 13/06
[52] U.S. Cl. ....................................... 411/55; 411/60; 411/80
[58] Field of Search ............... 411/30, 31, 55, 56, 411/57, 60, 61, 62, 41, 43, 75–80

[56] References Cited

U.S. PATENT DOCUMENTS

| 3,107,570 | 10/1963 | Zifferer | 411/60 |
| 4,560,311 | 12/1985 | Herb et al. | 411/55 |
| 4,640,654 | 2/1987 | Fischer et al. | 411/57 |
| 4,659,270 | 4/1987 | Herb | 411/60 |

FOREIGN PATENT DOCUMENTS

| 2533223 | 2/1977 | Fed. Rep. of Germany | 411/75 |
| 1321479 | 6/1973 | United Kingdom | 411/80 |

Primary Examiner—Neill Wilson
Attorney, Agent, or Firm—Toren, McGeady & Associates

[57] ABSTRACT

An expansion dowel assembly is made up of an axially extending dowel body and an expansion member in contacting engagement with the dowel body. The expansion member extends in the axial direction of the dowel body and is formed by a main part and an extension part projecting axially from the main part in the insertion direction of the assembly into a borehole. The cross-sectional area of the extension part transverse to the axial direction is smaller than the adjacent corresponding cross-sectional area of the main part. The extension part is shaped relative to the main part to increase the contact area of the expansion member with the dowel body and to prevent the development of excessively high surface pressures at the front end of the expansion member.

3 Claims, 2 Drawing Sheets

EXPANSION DOWEL ASSEMBLY WITH EXTENSION ON EXPANSION MEMBER

BACKGROUND OF THE INVENTION

The present invention is directed to an expansion dowel assembly made up of an axially extending dowel body and an expansion member in contacting engagement with the dowel body and with an extension part on the expansion member and contacting the dowel body.

Expansion dowel assemblies of the general type mentioned above exhibit an after-expansion characteristic in use, that is, additional expansion occurs if a load is applied to the dowel body after the assembly has been set in a borehole. As a result, such dowel assemblies are often utilized for dynamic loads.

The expansion member must be capable of axial displacement relative to the dowel body so that after-expansion can take place, however, such relative movement is not always possible in known expansion dowel assemblies. Due to the development of excessively high surface pressures, the expansion member can become seized with the dowel body with the effect that in practice the expansion member is cold-welded with the dowel body. Excessively high surface pressures are produced when non-uniform distribution of the expansion pressure occurs and primarily such pressures are developed at the front end of the expansion member. If the expansion member becomes seized with the dowel body, in effect, it bites into the surface of the dowel body and further relative displacement of the expansion member and the dowel body is impossible. Providing the expansion member with a fillet radius, chamfering or the like can not solve the problem and leads to increased costs in fabrication.

SUMMARY OF THE INVENTION

Therefore, it is the primary object of the present invention to provide an expansion dowel assembly of the type mentioned above in which an adequate after-expansion characteristic is assured.

In accordance with the present invention, the expansion member has an extension part at its front end and the extension part has a reduced cross-sectional area transverse to the axial direction of the dowel assembly as compared to the adjacent corresponding cross-sectional area of the main part of the expansion member.

The extension part with a reduced cross-sectional area relative to the adjacent corresponding area of the main part of the expansion member affords an additional contact face whereby the pressure per unit area developed during expansion is reduced and the pressure is better distributed.

An effective distribution of the pressure developed in the expansion member is achieved by the extension part with the axial extent of the extension part being in the range of 0.1 to 0.3 times the axial dimension of the main part of the expansion member. Accordingly, the total area at the most highly loaded region of the expansion member is increased by at least 10%. Since the pressure distribution in the expansion member is mostly non-uniform, due to the extension part, the peak pressure is reduced by about one-half.

The after-expansion in known dowels is mainly prevented by seizure between the expansion member and the dowel body. To avoid such an occurrence the extension part and the main part of the expansion member form a common inner contour surface. Thus, the extension part increases the inner surface area of the expansion member. Due to the shaped configuration of the extension part its outer surface, for the most part, does not contact the surface of the borehole wall. Accordingly, the widening of the expansion member in the region of the extension part is not impaired on its outer surface.

Depending on its manner of production and the intended use of the expansion dowel assembly, the expansion member can be formed in various ways. One appropriate embodiment is to provide the extension part on an annularly shaped expansion member. An annularly shaped expansion member affords a uniform distribution of the expansion pressure around its circumferential surface. Moreover, annularly shaped expansion members are easy to fabricate. Further, the expansion member can be provided with axially extending slots to facilitate its expansion.

In another preferred embodiment the extension is formed as part of a wedge-shaped expansion member tapering in the insertion direction of the dowel assembly into a borehole. Wedge-shaped expansion members are also easy to produce and can be employed with dowels with or without initial expansion. For a dowel assembly with initial expansion, the dowel body is tube-shaped and the expansion member has a protuberance projecting into the bore of the dowel body so that an installation tool can be inserted into contact with the protuberance for driving the expansion member.

In another preferred embodiment the extension part is formed on a plate-shaped expansion member. A plate-shaped expansion member inserted within an appropriate opening in a sleeve-shaped dowel body can effect a widening of the dowel body around its entire circumferential surface. In this embodiment the expansion member and the dowel body can be fabricated by stamping them out of sheet metal.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
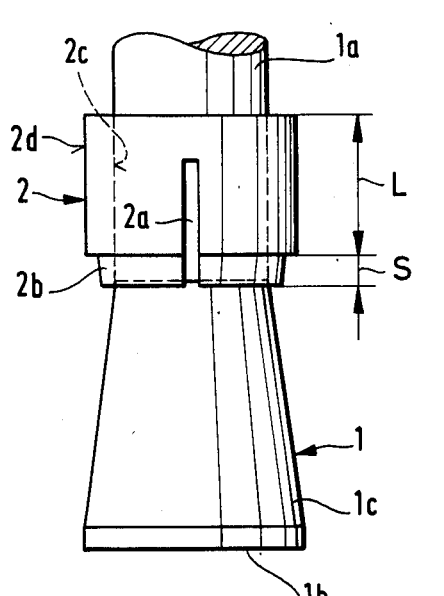
FIG. 1 is a partial elevational view of an expansion dowel assembly embodying the present invention and displayed in the unexpanded state.
Figure 2:
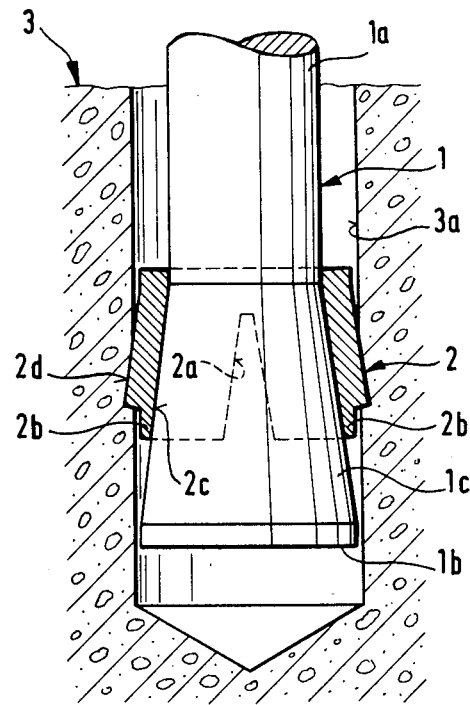
FIG. 2 is a view similar to FIG. 1 with the expansion member shown in section and the dowel assembly illustrated in the expanded state.
Figure 4:
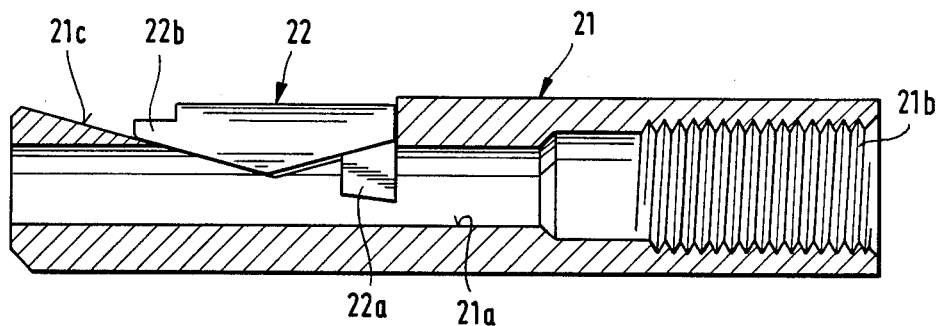
FIG. 4 is an axially extending sectional view of another embodiment of an expansion dowel assembly embodying the present invention and exhibited in the unexpanded state.
Figure 5:
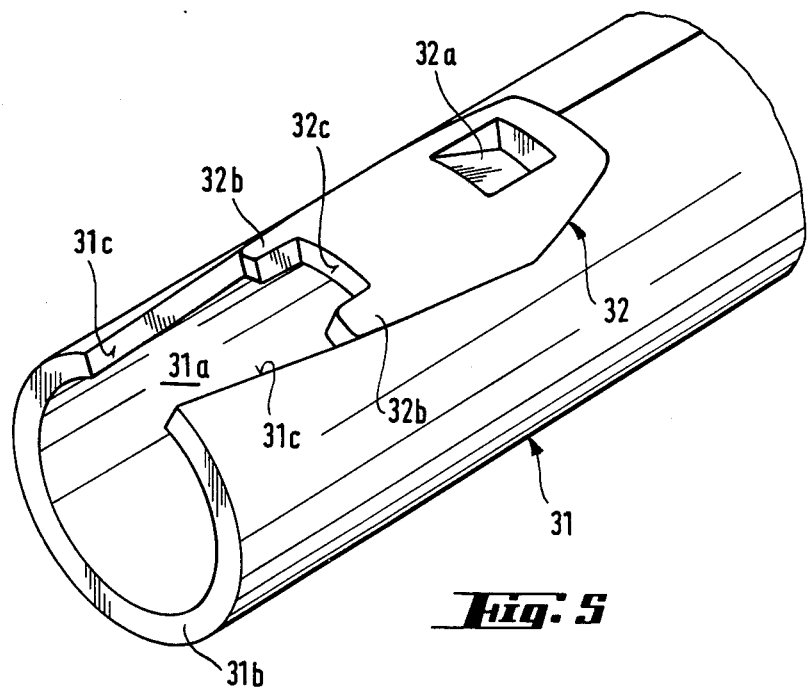
FIG. 5 is a perspective view of still another embodiment of the present invention with the assembly displayed in the unexpanded state.

In FIGS. 1 and 2 the expansion dowel assembly includes an axially extending dowel body 1 and a sleeve-shaped expansion member 2 laterally enclosing the dowel body. As viewed in FIGS. 1–3 the lower end of the dowel body and the expansion member is the front end and the upper end is the rear end. In FIGS. 4 and 5 the front end is located at the left-hand side and the rear end at the right-hand side.

Dowel body 1 has an axially extending cylindrical shank 1a with the front end of the shank connected to an expanding cone 1c which widens conically from the shank to the front end 1b of the dowel body. Expansion member 2 has a radially inner and radially outer surface with a number of axially extending slots 2a extending from the front end to a location short of the rear end. The slots 2a serve to improve the expansion of the expansion member. Further, the expansion member has a main part extending axially from the rear end toward the front end with an extension part 2b extending axially from the main part to the front end of the expansion member. Extension part 2b has a reduced cross-sectional area transverse to the axial direction of the expansion member as compared to the front end of the main part of the expansion member adjacent the extension part. The main part and the extension part 2b form a common inner contour surface 2c for the expansion member 2. As can be seen in FIGS. 1 and 2, the outer surface of the expansion part 2b is stepped inwardly from the outer surface 2d of the main part of the expansion member. As a result, a shoulder is formed in the outer surface of the expansion member at the transition from the extension part 2 to the main part. Accordingly, the area of the outer surface 2d of the main part of the expansion member 2 is smaller than the inner surface 2c formed by both the main part and the extension part. Accordingly, the pressure developed on the inside surface of the expansion member 2 is smaller per unit area than on the outer surface formed by the surface 2d of the main part.

In FIG. 2 the expansion dowel assembly is inserted into an axially extending borehole 3a in a receiving material 3, note that the front end 1b of the dowel body 1 is the leading end extending into the borehole. If a pulling force is applied to the dowel body 1 then a relative axial displacement of the dowel body takes place with respect to the expansion member 2. Because of the conical configuration of the cone 1c on the front end of the dowel body, during relative movement, the expansion member is widened radially and pressed against the surface of the borehole 3a. Because of the inwardly stepped configuration of the extension part 2b, it does not contact the surface of the borehole. As a result, the pressure developed at the front end of the expansion member 2, that is, in the region of the extension part 2b, with the dowel body 1 is quite small. Accordingly, the danger of seizure between the expansion member 2 and the dowel body 1 is avoided.

Figure 3:
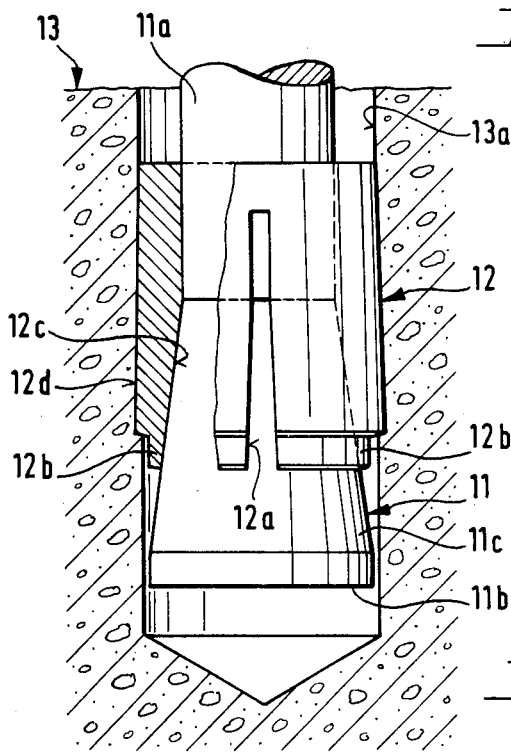
FIG. 3 is another embodiment of the present invention, similar to the illustration in FIG. 2, with the dowel assembly in the expanded state.

FIG. 3 displays another embodiment of the expansion dowel assembly of the present invention. The assembly is made up of an axially extending dowel body 11 and an expansion sleeve 12. Dowel body 11 includes an axially extending shank 11a with an expansion cone 11c projecting axially from the front end of the shank so that the cone forms the front end 11b of the dowel body. Since the cone 11c widens in the axial direction from the front end of the shank 11a, an axially tapered recess is formed around the cone toward the front end of the dowel body. The dowel assembly is inserted into a borehole 13a in receiving material 13. The inside surface of the expansion member 12 has an axially extending cylindrically shaped surface extending from the rear end to a midway point where the inside surface widens conically to the front end of the expansion member. The expansion member has an axially extending main part extending from its rear end toward the front end with an extension part 12b extending axially from the main part to the front end of the expansion member. The extension part 12b is stepped inwardly from the outer surface of the main part. Accordingly, the reduced wall thickness dimension of the extension part 13b prevents, when the expansion member is expanded, that the outer surface 12d in the region of the extension part 12b comes into contact with the surface of the borehole 12a. Expansion member 12 is also provided with axially extending slots 12a for facilitating the expanding process.

In FIG. 4 another embodiment of the expansion dowel assembly of the present invention is shown in axial section and includes a tubular dowel body 21 and an expansion member 22. Dowel body 21 has an axially extending through-bore 21a with an internal thread 21b extending from its rear end for a portion of the axial length of the dowel body. Adjacent the front end, the dowel body 21 has an axially extending approximately wedge-shaped recess 21c in which the correspondingly shaped expansion member 22 is positioned. Expansion member 22 has a shoulder 22a on its surface facing into the bore 21a so that the shoulder projects into the bore and serves for the initial expansion of the dowel assembly. By inserting an expansion tool through the bore from the rear end of the dowel body, the tool can displace the expansion member axially toward the front end of the dowel body securing the assembly within a borehole. Expansion member 22 has a main part extending from the rear end to adjacent the front end with an extension part 22b projecting axially from the main part and forming the front end of the expansion member. Extension part 22b has its outer surface stepped inwardly from the outer surface of the main part. Accordingly, extension part 22b forms a reduced cross-sectional area at the front end region of the expansion member as compared to the adjacent corresponding cross-section of the main part. This arrangement serves to reduce the pressure developed between the expansion member 22 and the dowel body 21. Under normal conditions, the extension part 22b does not contact the surface of the borehole during the expanding procedure.

In FIG. 5 another expansion dowel assembly incorporating the present invention is illustrated made up of a sleeve-shaped dowel body 31 and a plate-shaped expansion member 32. Extending from the front end 31b of the dowel body toward its rear end, a recess 31a is formed with the axially extending sides 31c of the recess initially diverging from the front end toward the rear end and then adjacent the rear end of the recess the sides 31c converge inwardly. Expansion member 32 is fitted within the recess 31a with the axially extending sides of the expansion member in contact with the axially extending sides 31c of the recess. Adjacent the rear end of the expansion member, an indented portion 32a is provided with the indented portion projecting inwardly into the bore formed through the dowel body 31. The indented portion forms a shoulder extending into the bore so that, as in the embodiment of FIG. 4, an expansion tool can be inserted through the sleeve-shaped dowel body for driving the expansion member in the axial direction through the recess 31a toward the front end 31b of the dowel body. The expansion member 32 is formed by a main body extending from the rear end of the recess and by extension parts 32b extending from the front end of the main part. The extension parts 32b are formed by a cutout 32c in the front end of the expansion member. The two extension parts 32b extend along the opposite sides 31c of the recess 31a. The extension parts 32b are deformable to a limited extent. When the expansion member 32 is driven axially toward the front end 31b of the dowel body by an expansion tool, not shown, the extension parts are deformed inwardly toward one another due to the converging sides 31c of the recess 31a. Due to the cutout 32c separating the extension parts 32b there is a reduction in the edge pressure at the front end of the expansion member and seizure of the expansion member along the sides 31c of the recess 31a in the dowel body 31 is prevented.

While specific embodiments of the invention have been shown and described in detail to illustrate the application of the inventive principles, it will be understood that the invention may be embodied otherwise without departing from such principles.

We claim:

1. Expansion dowel assembly for use in an axially extending borehole comprising an axially extending dowel body and an expansion member extending in the axial direction of and in engagement with said dowel body, said dowel body and expansion member each have a front end facing in the insertion direction in which the dowel assembly is placed into a borehole and a rear end spaced in the axial direction of the dowel body and facing in the opposite direction from the front end, wherein the improvement comprises that said expansion member has a main part extending in the axial direction of said dowel body and having a first end facing in the insertion direction and an extension part extending in the axial direction of said dowel body and projecting axially from the first end of said main part in the insertion direction, said extension part having a cross-sectional area transverse to the insertion direction smaller than the corresponding cross-sectional area at the front end of said main part, said dowel body is a tubular-shaped member having an opening extending therethrough from the inner surface to the outer surface and extending from the front end of said dowel body toward the rear end thereof, said opening having oppositely disposed spaced sides diverging in the direction from the front end toward the rear end of said dowel body, and said expansion member comprises a plate-shaped member fitted into the opening in said dowel body with the front end of said expansion member spaced from the front end of said dowel body in the direction toward the rear end of said dowel body, said extension part of said expansion member comprising a pair of laterally spaced extension parts each in contact with an opposite side of said opening.

2. Expansion dowel assembly, as set forth in claim 1, wherein the dimension of said extension part extending in the insertion direction is in the range of 0.1 to 0.3 times the corresponding dimension of the main part of the expansion member.

3. Expansion dowel assembly, as set forth in claim 1, wherein said dowel body comprises a tubular shaped member having a bore therethrough, said expansion member having a protuberance thereon extending into the bore in said dowel body so that an expansion tool can be inserted into the bore from the rear end of said dowel body into contact with said protuberance for axially displacing said expansion member relative to said dowel body.

* * * * *